March 3, 1970 H. LEIBER 3,498,683
VEHICLE BRAKE CONTROL SYSTEM FOR PREVENTING WHEEL LOCKING
Filed Nov. 29, 1967 2 Sheets-Sheet 1

INVENTOR.
Heinz Leiber
BY Spencer & Kaye
ATTORNEYS

United States Patent Office 3,498,683
Patented Mar. 3, 1970

3,498,683
VEHICLE BRAKE CONTROL SYSTEM FOR
PREVENTING WHEEL LOCKING
Heinz Leiber, Leimen, Germany, assignor to Teidix
Luftfahrt-Ausrustungs G.m.b.H., Wiebtingen,
Germany
Filed Nov. 29, 1967, Ser. No. 686,492
Claims priority, application Germany, Dec. 3, 1966,
T 326,621
Int. Cl. B60t 8/06, 8/12
U.S. Cl. 303—21                              12 Claims

ABSTRACT OF THE DISCLOSURE

A vehicle brake control system for preventing wheel locking which momentarily retains the braking force applied to a wheel at a reduced level after the braked wheel has exceeded a certain threshold of rotational deceleration. The control system includes a rotational acceleration sensor, in addition to the sensor for detecting excessive deceleration and which produces an output when the braking force is applied and when the value of rotational acceleration exceeds a certain threshold. The control system further includes means for receiving the output of the acceleration sensor and providing that the braking force be at a reduced level during a period of time which is dependent on the time during which the output is present.

BACKGROUND OF THE INVENTION

The present invention relates to a vehicle brake control system for preventing wheel locking; more particularly, to a brake control system for momentarily retaining braking force at a reduced level after a braked wheel has exceeded a threshold of rotational deceleration.

Vehicle brake control systems for preventing wheel locking have been proposed which operate with two separately controlled solenoid valves: namely, an inlet valve which closes the line between the master brake cylinder and the wheel brake cylinder and an outlet valve which opens the line between the wheel brake cylinder and the portion of the brake system which is not under pressure. If both of these valves are closed, the braking pressure in the wheel brake cylinder is maintained at a constant level, unless, as has also already been proposed, the inlet valve is bridged by a parallel channel having a channel restriction. If this is the case, the brake pressure can, in fact, slowly increase, however at a rate which is incomparably less than the speed with which it would increase were the inlet valve open. This restricted bypass type of system may therefore be included in the systems discussed below, and the brake pressure always assumed to be a constant when both valves are closed.

The two-valve system operates with a rotational deceleration sensor in a manner such that if the rotational deceleration exceeds a certain threshold, it will close the inlet valve and open the outlet valve to reduce the brake pressure. When the rotational deceleration drops below the predetermined threshold value again, it closes the outlet valve but retains the inlet valve in the closed position to hold the brake pressure constant. A system timer device then acts to open the inlet valve after a predetermined time delay and permits the brake pressure to rise to the value specified by the driver of the vehicle.

SUMMARY OF THE INVENTION

An object of the present invention is to improve brake control systems for preventing wheel locking so that the braking distance of the vehicle may be shortened.

More particularly, an object of the present invention is to obviate the disadvantage of brake control systems previously proposed wherein whenever the braked wheel reached a portion of the pavement that afforded considerably better traction (for example, at the transition point beween slippery ice and dry pavement), the brake pressure would only increase to its driver-determined value after the expiration of the delay time.

This and other objects which will become apparent in the discussion that follows are achieved, according to the present invention, by making the time during which the brake pressure is retained dependent upon the time during which the rotational acceleration of the particular wheel or the particular vehicle axle lies above a certain lower threshold value.

Two wheel sensors or one sensor with two different switching devices are therefore employed. One of these sensors or switching devices is designed to measure the rotational deceleration of the wheel; the other of the sensors or switching devices is designed to measure the rotational acceleration of the wheel.

The switching devices themselves, located either in the two sensors or in the single sensor, may be realized with simple mechanical contacts. It should be understood, however, that other devices, such as inductive switching elements or semi-conductors may be substituted for mechanical contacts. Since spring contacts have proven suitable in practice, however, only the mechanical contact embodiment will be presented in the discussion that follows. For the sake of simplicity, these contacts will simply be designated as the deceleration contact and the acceleration contact, as the case may be.

The electric circuit between the deceleration contact and the solenoids of each of the two valves remains approximately the same as in the systems of the prior art. When the deceleration contact closes, the two solenoids will be excited and the two valves actuated. The acceleration contact is connected, on the other hand, to influence —that is, to close—the inlet valve alone. This contact thus only acts to prevent the quick increase of the brake pressure; it does not reduce the brake pressure.

A vehicle brake control system for preventing wheel locking having one sensor which actuates both upon rotational deceleration and upon rotational acceleration has been disclosed in DAS 1,203,624 (German printed patent). The two sensor contacts, in this prior art circuit are connected in parallel to the same magnet winding, however, so that the servo valve spool there illustrated will switch in the same direction, upon acceleration as well as upon deceleration. This causes the brake pressure to completely exhaust itself in two separate stages of reduction.

According to a particular embodiment of the present invention, the times determinative of the retention of the brake pressure are only those times in which the rotational acceleration lies between a lower and an upper threshold value. This feature may be realized in practice by designing the switching device of the sensor so that it closes when the acceleration increases above its lower threshold and opens again when the acceleration increases further beyond an upper threshold. If the acceleration sensor which is used is of the type having elastically coupled flywheels, the relative angular position of the flywheels (the contact path) will be a measure of the acceleration. The concept of the present invention may then be realized by employing a wiper or sliding contact, in the acceleration sensor, which only closes over a certain angular range.

The transition from the deceleration condition of a braked vehicle wheel to the condition of acceleration normally occurs in a very short time. It may be assumed, therefore, that the solenoid valves will hold their positions during the interval of time between the opening of the deceleration contact and the subsequent closing of the acceleration contact. However, if the valves employed are especially fast actuating, as is desirable in a vehicle brake control system, it is advisable to use a short time delay device, such as a simple RC series circuit, which holds the inlet valve closed for a short period of time after the contact or contacts which caused its excitation have been opened. This short period of time is made at least as large as the previously mentioned time interval.

Further embodiments of the present invention are directed to the electric circuit arrangement of the vehicle brake control system. According to a first embodiment, the deceleration contact is in series with the outlet valve winding, and the acceleration contact is in series with the inlet valve winding. If necessary, an amplifier, such as a transistor or a transistor circuit, may be inserted between the contacts and their respective magnet windings. An RC series circuit is also included in parallel with the inlet valve winding. The input terminals of both magnet windings are coupled together through a diode so that the deceleration contact can supply power to both valve windings and charge the capacitor. The acceleration contact, when closed, thus also charges the capacitor, but supplies excitation current only to the inlet valve winding. The capacitor is allowed to discharge only through the inlet valve winding.

A second embodiment is designed so that the acceleration contact will only be effective during the operating cycle of the control system for preventing wheel locking; that is, only if the deceleration contact has closed a short time previously. This allows the inlet valve to remain open if momentary acceleration "spikes" occur, for example, as the result of unevenness in the pavement. It is therefore proposed that a circuit element (such as a resistor in series with the acceleration contact) be employed which will allow only sufficient power to reach the inlet valve to maintain it in the actuated position when the acceleration contact is closed.

A preferred embodiment of this type of circuit permits, in addition, the elimination of one amplifier. According to this embodiment, only the amplifier connected with the outlet valve winding is retained; however, this amplifier is controlled by both the acceleration and deceleration contacts and produces different voltages for each. When the deceleration contact is closed, the amplifier operates at capacity, so that its output voltage lies above the actuating voltage of both solenoid valves. When the acceleration contact is closed, however, the amplifier is operated at only half its capacity so that its output voltage lies below the actuating voltage, but above the retention voltage of the solenoid valves so that the valve armatures which have been actuated remain in the actuated position. When the acceleration contact closes, the armature of the outlet valve has already returned to its normal position; the armature of the inlet valve, however, has been held in the actuated position due to the capacitor discharge current. The acceleration contact has no effect, therefore on the already closed outlet valve, but continues to hold the inlet valve in its closed position.

A third embodiment of the present invention, which preferably relates to a circuit having a wiper contact in the acceleration sensor, is designed so that the short time delay device is only effective after the deceleration contact is opened. The delay device does not operate to hold the inlet valve closed after the acceleration contact has opened. To this end there are two diodes—not one—arranged in series between the inputs of the magnet windings. The RC circuit member is connected between the conductor interconnecting the two diodes and the output of the inlet valve winding.

DESCRIPTION OF THE PREFERRED EMBODIMENTS

Figure 1:
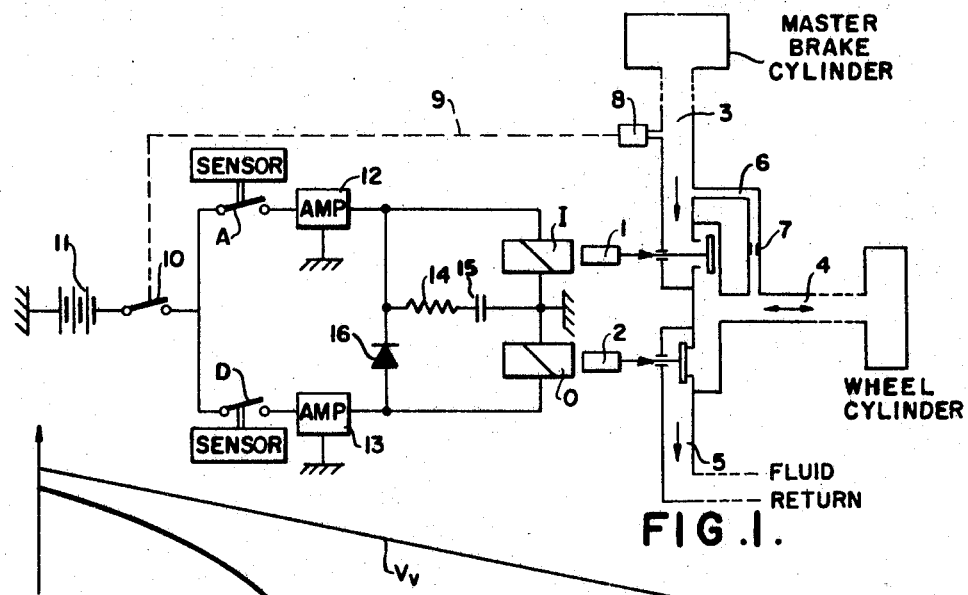
FIGURE 1 is a schematic diagram of a portion of a controlled hydraulic brake system together with one electrical control circuit embodiment, according to the present invention.

Turning now to the drawings, there is shown in FIGURE 1 one embodiment of the brake control system according to the present invention. The system includes an inlet valve having a magnet winding I and an outlet valve having a magnet winding O. The inlet valve is normally open and closes when the armature 1 moves toward the left under the influence of an excited winding. The arrow head on the valve stem is intended to designate the direction of the valve return spring force. The outlet valve armature which is designated with the numeral 2 is, in accordance with this manner of representation, normally closed. The pressure medium enters the hydraulic portion of the brake control system at the inlet 3. The pressure medium at this point is under the pressure developed by the master brake cylinder. The outlet of the control system that is connected with the wheel brake cylinder is designated with the numeral 4; the outlet 5 opens into the low pressure return line. The inlet valve is bridged by a parallel line 6 which has a restriction 7. A pressure sensitive device 8, such as a diaphragm, closes a switch contact 10 by means of the mechanical connection 9 so that the entire brake control system for preventing wheel control locking is only actuated when a certain minimum brake pressure is present. This minimum brake pressure as well as the method of operation of the switch contact 10 approximately corresponds to the actuating pressure and operation of the brake light switches common in the art.

The supply voltage is produced by a battery 11 one pole of which is connected to ground, the other pole to the switch contact 10. The circuit divides into two branches after the contact 10; one branch passes through an acceleration contact A, an amplifier 12 and the magnet winding I of the inlet valve to ground; the other parallel branch passes through a delay contact D, and amplifier 13, and the magnet winding O of the outlet valve likewise to ground. Parallel to the inlet valve winding I is a series circuit comprising a resistor 14 and a capacitor 15. A diode 16 is connected in the circuit between the branch portions joining the acceleration and deceleration contacts and their respective magnet windings in such a way that current is allowed to flow from the deceleration contact D to the resistor 14 and to the inlet valve winding I. No current can flow, however, from the acceleration contact A to the outlet valve winding O.

Since the deceleration and acceleration switches are known in the art per se, the actuating mechanism for the contacts D and A will not be shown or described herein. Suffice it to say that the contact D is closed whenever the rotational deceleration of the braked wheel or axle lies above a given rotational deceleration threshold value, and that the contact A is closed whenever the rotational acceleration of the wheel or axle lies above a rotational acceleration threshold value. The absolute values for the two thresholds do not need to be numerically equal. In the example described below in accordance with FIGURE 2, the rotational deceleration threshold value which is designated by the dotted-dashed line 17 is considerably higher than the rotational acceleration threshold value designated by the dotted-dashed line 18.

Figure 2:
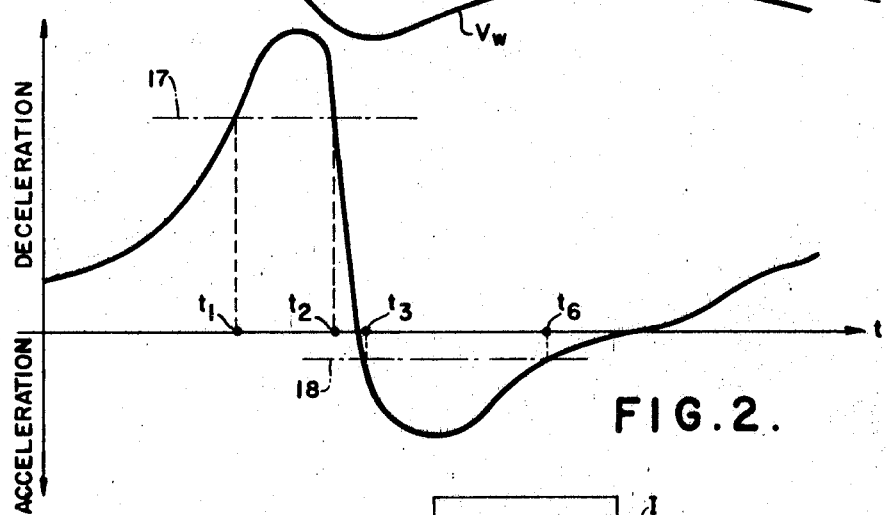
FIGURE 2 is an exemplary graph of certain variables which are of importance in the system of FIGURE 1.

The operation of the circuit illustrated in FIGURE 1 will now be described with reference to the graph of FIGURE 2. It is assumed that the vehicle which incorporates this brake control system is travelling forward with the brakes applied and that, therefore, the contact 10 is closed. The slowly falling vehicle speed $V_v$ is graphed with respect to the time $t$ at the top of FIGURE 2. The tangential or circumferential speed of the wheel $V_w$ is also shown by the middle curve of FIGURE 2. The lower curve of FIGURE 2 represents the circumferential speed of the wheel differentiated with respect to the time; the deceleration is plotted above and the acceleration is plotted below the time axis.

If the braking force of the vehicle wheel is too high in relation to the pavement surface, the circumferential speed of the wheel will reduce much faster than the vehicle speed; that is, the wheel locking process will begin. As soon as the circumferential deceleration of the wheel which, in the description below will simply be designated as the "deceleration," climbs to a point above the threshold line 17, the contact D will close. This occurs at the time $t_1$. Both magnet windings I and O will be excited as a result and switch both valve elements to positions opposite those shown in FIGURE 1. The capacitor 15 will, in addition, be charged.

The brake fluid will now escape through the outlet valve causing a reduction in the braking force. The deceleration will therefore be reduced after reaching a maximum and, at time $t_2$, will fall below the threshold line 17 causing the contact D to open. Although the outlet valve will now close again, the inlet valve will be held closed because its magnet winding I will continue to be excited by the discharge current of the capacitor 15. The discharge circuit is designed to insure that sufficient excitation current flows to the magnet winding I to maintain the inlet valve in the closed position at least until the time $t_3$.

By this time the wheel has already begun to accelerate and has just exceeded the acceleration threshold designated by line 18. The contact A therefore closes and, with the help of the amplifier 12, undertakes to maintain excitation of the magnet winding I and to recharge the capacitor 15.

The inelt valve thus continues to remain in a closed position. Although the brake pressure is allowed to increase in the meantime, as a result of the restriction line 6, this increase is so slow that, to a first approximation, the brake pressure may be assumed to be held constant.

The acceleration will now drop again as the circumferential speed of the wheel $V_w$ approaches, closer and closer though without reaching the speed of the vehicle $V_v$. At time $t_6$ the acceleration drops below the threshold line 18 and opens the contact A. The inlet valve will remain closed for a short time longer, however, until the capacitor 15 has discharged. When the inlet valve opens, the brake pressure on the wheel cylinder rises relatively quickly to the pressure produced by the master brake cylinder. Since the wheel deceleration begins to climb again, the curve showing the circumferential speed of the wheel $V_w$ will reach the maximum and then begin to fall. The brake control system will at this time be ready for a new operating cycle.

Figure 3:
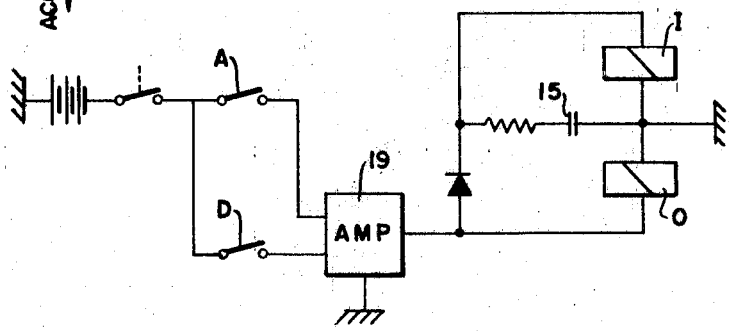
FIGURE 3 is a schematic diagram of another electric circuit embodiment of the present invention.

The circuit of FIGURE 1 can be simplified in a manner diagrammatically illustrated in FIGURE 3. This circuit is provided with a two-input amplifier 19 in place of the amplifier 13. One of the two inputs is connected to each of the contacts A and D. The amplifier 19 is designed to produce an output of differing voltage depending on whether the contact A or the contact D is closed. This might be accomplished by employing a transistor the base of which is connected to two voltage dividers individually switchable by means of the acceleration and deceleration contacts. These voltage dividers may be designed to apply potentials of different values to the base of the transistor when the switches are closed. Inasmuch as any such circuit known in the art can be employed for the amplifier 19, this transistor circuit has not been included in FIGURE 3.

The rest of the circuit of FIGURE 3 corresponds to that shown in FIGURE 1. The construction of the valves as well as the associated brake fluid system corresponds to the valve and brake fluid system of FIGURE 1. For reasons of clarity, this system has been deleted from FIGURE 3.

The circuit of FIGURE 3 operates as follows: When the deceleration contact D is closed, the amplifier 19 produces an output voltage sufficiently high to activate both valves as has been discussed in connection with FIGURE 1 and FIGURE 2. The output voltage produced when the acceleration contact A is closed is only large enough, however, to enable the excited magnet windings to hold the valve armatures in the engaged position. The voltage is not sufficient to cause either the inlet valve to close or the outlet valve to open.

As may be appreciated from the description, above, of the operating cycle of the circuit of FIGURE 1, when the contact A closes the amplifier 19 will hold the inlet valve in its closed position. Insufficient voltage will be present, however, to open the outlet valve which, at this time, has been fully deenergized. Since the capacitor 15 will receive less charge from the reduced voltage than it would in the circuit of FIGURE 1, the inlet valve will open sooner subsequent to the time $t_6$. Otherwise the circuit of FIGURE 3 operates in the same manner as the circuit of FIGURE 1.

Figure 4:
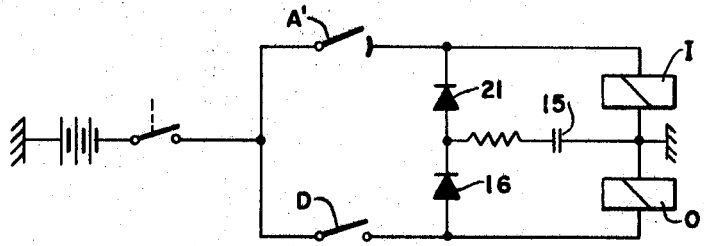
FIGURE 4 is a schematic diagram of still another electric circuit embodiment of the present invention which includes a wiper contact.

FIGURE 4 illustrates another embodiment of the present invention which operates to special advantage if the braked vehicle passes over a section of pavement which suddenly increases in friction. The circuit shown here is very similar to the circuit of FIGURE 1. The two amplifiers have been removed to illustrate the fact that they are not necessary, in theory, to the operation of the circuit. The acceleration contact, designated here as A', is so constructed that, when it is actuated in the closing direction, it closes first then opens again. The same is true also for the reversed switching direction. As a result of this arrangement there is established a lower and an upper acceleration threshold value; the contact A' will be closed so long as the acceleration lies between these two values The lower threshold value corresponds to the threshold line 18 drawn in FIGURE 2 and is therefore so designated also in FIGURE 5. The upper threshold value, on the other hand is designated by a dotted-dashed line 20 in FIGURE 5.

As will become apparent in the discussion below, it is especially desirable here that the short time delay device consisting of the resistor 14 and the capacitor 15 be effective only during the time span from $t_2$ to $t_3$. After the acceleration has exceeded the upper acceleration threshold line 20, the inlet valve should react immediately to the opening of the acceleration contact A'. For this reason the circuit of FIGURE 4 is provided with a second diode 21 in addition to and in series with the diode 16. The RC circuit is connected to the conductor interconnecting these two diodes. Although the fundamental operation of the circuit of FIGURE 4 remains the same as that of the circuit of FIGURE 1, capacitor 15 will no longer be charged when the acceleration contact A' is closed.

It is to be understood that the additional diode 21 shown in FIGURE 4 can also be inserted in the circuit of FIGURE 1 which has but the simple acceleration contact A. This embodiment of the invention is not illustrated as a separate figure, however, since the circuit of FIGURE 1 remains otherwise unchanged.

Figure 5:
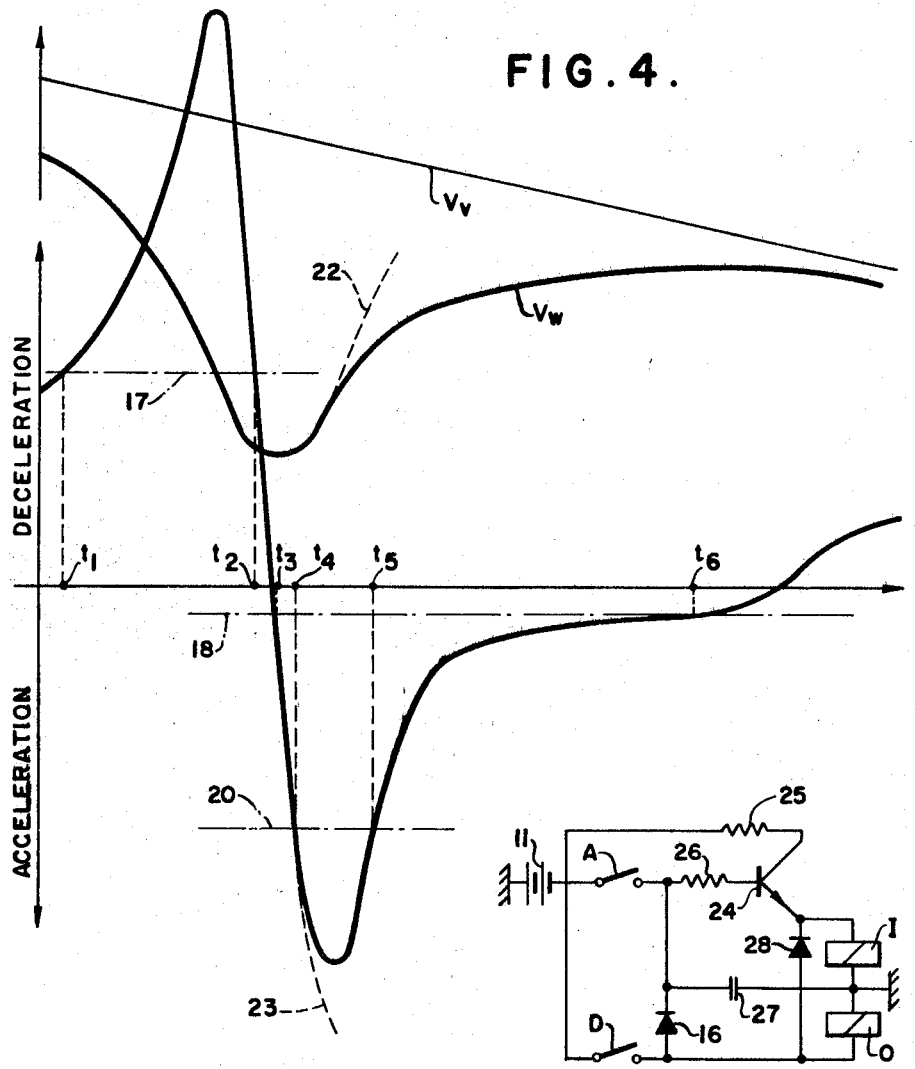
FIGURE 5 is an exemplary graph of certain variables which are of importance in the system of FIGURE 4.

Turning now to the graphs of FIGURE 5 which illustrate the operation of the circuit of FIGURE 4, it will be assumed that the vehicle is being braked over slippery pavement and the wheel which is monitored by the brake control system of FIGURE 4 is already experiencing a sharp deceleration. The deceleration contact D will be closed from the time $t_1$ to the time $t_2$ causing a reduction in the brake pressure. From $t_2$ to $t_3$ both contacts will be open and both valves closed as has been described above. The capacitor 15 will discharge through the inlet valve winding. The brake pressure will remain constant.

From $t_3$ on the wheel acceleration increases at an unusually sharp rate. Let it be assumed that the main cause for this sharp acceleration increase is that, just at the moment of transition between the deceleration and acceleration of the wheel, the friction of the pavement suddenly increased. If the contact A' were not arranged as a wiper contact as shown in FIGURE 4, the curve showing the circumferential wheel speed would correspond approximately to the dashed line 22, and the acceleration curve would continue generally as shown by the dashed line 23.

In this case, however, the acceleration contact will open after the acceleration crosses the upper threshold line 20 at time $t_4$. The result, an immediate de-excitation of the inlet valve winding I, will cause the inlet valve to open and the brake pressure to rise. The increased brake pressure will quickly reverse the direction of the acceleration curve and break the wheel speed curve $V_w$ toward the right. The upper threshold line 20 will be crossed again a short time later at $t_5$. This will cause the acceleration contact A' and, in turn, the inlet valve again to close. The brake pressure, which will now be present and held constant, will be better adapted to the friction of the pavement; the wheel speed curve will not rise above the vehicle speed curve but slowly approach it from below. The lower threshold line 18 will be crossed again at $t_6$, as described in connection with FIGURE 2. The acceleration contact A' will then open and cause, this time without an additional time delay, the inlet valve to open. When the acceleration curve has returned to zero the circumferential speed of the wheel will attain its maximum. A new operating cycle of the brake control device can then begin.

Under certain circumstances it may be of advantage, or even necessary, that the short time delay device be fully effective even upon very short closing times ($t_1$ to $t_2$) of the deceleration contact D. It is also of advantage to employ capacitors in the circuit which are both small and inexpensive. All of these advantages may be obtained if the inlet valve is placed under the control of a transistor that has the capacitor connected in its base circuit.

Figure 6:
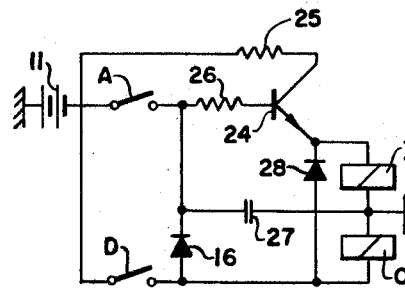
FIGURE 6 is a schematic diagram of still another electric circuit embodiment of the present invention which incorporates a transistor.

An example of this type of transistor circuit is shown in FIGURE 6. The inlet valve winding I is directly connected with the power supply 11 through the emitter-collector path of the transistor 24 and a resistor 25. The base of the transistor is connected through a resistor 26 to the acceleration contact A and the usual diode 16. The common terminal of the resistor 26 and diode 16 are connected to ground through the capacitor 27. Finally, the deceleration contact D is so connected, by means of a diode 28, that the winding of the inlet valve will be excited through this path when the deceleration contact is closed.

The circuit of FIGURE 6 operates as follows: When will be immediately excited. The transistor will switch to its conducting state so that the inlet valve winding will receive current through the two parallel circuit branches. The capacitor 27 will simultaneously receive a charge. If the deceleration contact is then opened, current will no longer flow to the outlet valve; however, the transistor will continue to feed the inlet valve winding until the capacitor 27 has discharged to a certain voltage level. If the acceleration contact now closes or has previously been closed, the capacitor will be recharged and the inlet valve winding will remain excited through the transistor path. If it is desired, however, that the inlet valve be opened without a time lag, an additional diode may be provided in series with the diode 16 in the manner shown in FIGURE 4 to prevent the recharging of the capacitor.

The control system can further be simplified if the inlet valve itself is so constructed that it opens after a time delay. Such a delay may be achieved through the proper arrangement of the fluid flow channels inside the valve and/or through the use of suitable materials for the magnet system. It is possible, in particular, to employ, at least in part, permanent magnet materials in the inlet valve magnet system.

It will be understood that the above description of the present invention is susceptible to various modifications, changes, and adaptations, and that the same are intended to be comprehended within the meaning and range of equivalents of the appended claims.

What is claimed is:

1. In a brake control system for use with wheeled vehicles including a wheel brake and means for applying a braking force to said wheel brake, anti-skid brake control means comprising in combination:
   (a) rotational deceleration sensing means for producing a first signal when such braking force is applied and when the value of rational deceleration of such wheel exceeds a certain threshold value;
   (b) rotational acceleration sensing means for producing a second signal when such braking force is applied and when the value of rotational acceleration of such wheel exceeds a first threshold value and a third signal when such braking force is applied and when the value of rotational acceleration of such wheel exceeds a second threshold value, said second threshold value being greater than said first threshold value; and
   (c) third means, connected to said deceleration sensing and said acceleration sensing means to receive first, said second and said third signals, for quickly decreasing such braking force when said first signal appears, for holding such braking force substantially constant at the braking force that exists when said second signal appears and for quickly increasing such braking force when said third signal appears.

2. Anti-skid brake control means as defined in claim 1, wherein said third means includes means for controlling a brake fluid pressure applied to said wheel brake comprising, in combination:
   (1) a source of fluid pressure connected to said wheel brake;
   (2) a sink of fluid pressure connected to said wheel brake;
   (3) a two position inlet valve means connected between said source and said wheel brake;
   (4) a two position outlet valve means connected between said sink and said wheel brake;
said third means being operative in response to said first signal to close said inlet valve means and open said outlet valve means, operative in response to said second signal to close both of said valve means and operative in response to said third signal to open said inlet valve means and close sad outlet valve means.

3. Anti-skid brake control means as defined in claim 2, wherein said third means is operative to hold said inlet valve means closed for a short time after said first signal has disappeared.

4. Anti-skid brake control means as defined in claim 3, wherein said third means is arranged so that said short time is at least equal to the average time which occurs between the disappearance of said first signal and the appearance of said second signal.

5. Anti-skid brake control means as defined in claim 1, wherein said deceleration and said acceleration sensing means are included in a single means for sensing the change of rotational speed of such wheel.

6. Anti-skid brake control means as defined in claim 2, wherein said deceleration sensing means includes a deceleration electrical switch which closes to produce said first signal.

7. Anti-skid brake control means as defined in claim 6, wherein said acceleration sensing means includes an acceleration electrical switch which closes when said rotational acceleration is between said lower and said upper threshold to produce said second signal and which opens when said rotational acceleration is above said upper threshold to produce said third signal.

8. Anti-skid brake control means as defined in claim 7, wherein said first and second means and said deceleration and said acceleration sensing means are included in a single means for sensing the change of rotational speed of such wheel.

9. Anti-skid brake control means as defined in claim 7, wherein said inlet valve means is a normally open solenoid valve the solenoid of which is connected to said acceleration switch and said outlet valve means is a normally closed solenoid valve, the solenoid of which is connected to said deceleration switch.

10. Anti-skid brake control means as defined in claim 9, wherein at least one diode is connected between the signal sides of said acceleration switch and said deceleration switch, said diode being oriented so as to pass current from said signal side of said deceleration switch to said signal side of said acceleration switch.

11. Anti-skid brake control means as defined in claim 9, wherein a resistor in series with a capacitor is connected across said solenoid of said inlet valve means, thereby forming means for maintaining excitation in said solenoid of said inlet valve means for a short time after both of said switches have opened.

12. Anti-skid brake control means as defined in claim 11, wherein a first diode in series with a second diode is connected between the signal sides of said acceleration switch and said deceleration switch, said first and second diodes being oriented so as to pass current from said signal side of said deceleration switch to said signal side of said acceleration switch, and wherein one terminal of the two terminals of said resistor in series with said capacitor is connected to the conductor interconnecting said first and second diode.

References Cited

UNITED STATES PATENTS

| | | | |
|---|---|---|---|
| 3,237,996 | 3/1966 | Lucien | 303—21 |
| 3,288,540 | 11/1966 | Lucien | 303—21 |
| 3,066,988 | 12/1962 | McRae. | |

MILTON MUCHLER, Primary Examiner

J. J. McLAUGHLIN, Jr., Assistant Examiner

U.S. Cl. X.R.

188—181

UNITED STATES PATENT OFFICE
CERTIFICATE OF CORRECTION

Patent No. 3,498,683          Dated March 3, 1970

Inventor(s) Heinz Leiber

It is certified that error appears in the above-identified patent and that said Letters Patent are hereby corrected as shown below:

In the heading to the printed specification, lines 4 to 6, cancel "Teidix Luftfahrt-Ausrustungs G.m.b.H., Wiebtingen, Germany" should read -- Teldix Gesellschaft mit beschrankter Haftung, Heidelberg-Wieblingen, Germany --. Column 5, line 45, "inelt" should read -- inlet --. Column 6, line 29, "subsquent" should read -- subsequent --; line 46, "The" should read -- . The --. Column 7, line 63, after "When" insert -- the deceleration contact closes both valve windings --. Column 8, line 37, after "receive" insert -- said --; line 61, "sad" should read -- said --. Column 9, line 11, cancel "first and second means and said".

Signed and sealed this 3rd day of November 1970.

(SEAL)
Attest:

EDWARD M. FLETCHER, JR.
Attesting Officer

WILLIAM E. SCHUYLER, JR.
Commissioner of Patents